United States Patent [19]
Baldwin et al.

[11] Patent Number: 6,038,596
[45] Date of Patent: Mar. 14, 2000

[54] METHOD AND SYSTEM IN A NETWORK FOR DECREASING PERFORMANCE DEGRADATION TRIGGERED BY MULTIPLE USER REDUNDANT INPUT EVENTS

[75] Inventors: Wayne Ross Baldwin, Cedar Park; Athanasios George Gaitatzes, Austin, both of Tex.

[73] Assignee: International Business Machines Corporation, Armonk, N.Y.

[21] Appl. No.: 08/862,670

[22] Filed: May 23, 1997

[51] Int. Cl.[7] ............................. G06F 13/00; G06F 17/30
[52] U.S. Cl. ...................... 709/219; 709/219; 709/226; 709/217; 709/203; 345/326
[58] Field of Search ..................... 395/200.49, 200.54, 395/200.56, 200.33, 200.65, 200.78, 200.61, 200.71; 709/100, 104, 203, 219, 226, 224, 217; 370/234, 236

[56] References Cited

U.S. PATENT DOCUMENTS

| | | | |
|---|---|---|---|
| 5,261,054 | 11/1993 | Lerner et al. | 395/275 |
| 5,442,791 | 8/1995 | Wrabetz et al. | 395/674 |
| 5,475,843 | 12/1995 | Halviatti et al. | 395/700 |
| 5,648,965 | 7/1997 | Thadani et al. | 370/241 |
| 5,774,660 | 6/1998 | Brendel et al. | 395/200.31 |
| 5,822,207 | 10/1998 | Hazama et al. | 364/468.03 |
| 5,822,543 | 10/1998 | Dunn et al. | 395/200.54 |
| 5,835,765 | 11/1998 | Matsumoto | 395/672 |
| 5,842,216 | 11/1998 | Anderson et al. | 707/203 |
| 5,889,942 | 3/1999 | Orenshteyn | 713/201 |

OTHER PUBLICATIONS

Robert B. Hess, Generic: Anatomy of a Simple WIN32 Application (MSDN), Oct. 17, 1994, p. 3.
Excerpt from Japan patent No. JP08161323–A dated Jun. 21, 1996.
Excerpt from Japan patent No. JP04–360223 dated Dec. 14, 1992.
Tessier, T., "Using JavaScript to create interactive Web pages" (excerpt).
Karshmer, A.I.; Kaugars, K., "Equal access to information for all: making the world of electronic information more accessible to the handicapped in our society," Copyright 1996, IEE (excerpt).
Lewis, H.G., "Cruisin' down the "hype–er space" road: how to write copy for the (Gulp!) Internet," Copyright 1996, IEE (excerpt).
Sedayao, J., "World Wide Web network traffic patterns," Copyright 1995, IEE (excerpt).
Gordon Sorohan, E., "The attractions of the Internet" (excerpt).
Seiler, F.P.; Vigouroux, N.; Busboom, M.; Arato, A.; Vaspori, T.; Kravcik, M.;.
Klaus, J., ED.; Auff, E., ED.; Kremser, W., ED.; Zagler, W.L., ED., "Electronic information management by blind persons," Copyright 1996, IEE (excerpt).
Bryson, E., "The World Wide Web: a web even a fly would love,"Copyright 1996, IEE (excerpt).

*Primary Examiner*—Dung C. Dinh
*Assistant Examiner*—Abdullahi E. Salad
*Attorney, Agent, or Firm*—Volel Emile; Lisa B. Yociss; Andrew J. Dillon

[57] ABSTRACT

A method and system are disclosed in a network application for decreasing performance degradation by preventing inadvertent launching of multiple copies of identical network applications. Initially, a remote application is launched from a server to a client in response to a user input event. Next, it is determined if a remote application identical to the remote application has already been launched. If the remote application has already been launched, an elapsed time since the identical remote application was initially launched is determined. Thereafter, the launching of the network application is terminated if the elapsed time is less than a preset value. Alternatively, if the elapsed time is greater than the preset value, the network application is launched. Additionally, if the elapsed time is greater than the preset value, a weighted value of applications running with the client is determined. Thereafter, the network application is launched if the weighted value is small. Alternatively, if the weighted value is large, launching of the network application is terminated.

17 Claims, 6 Drawing Sheets

METHOD AND SYSTEM IN A NETWORK FOR DECREASING PERFORMANCE DEGRADATION TRIGGERED BY MULTIPLE USER REDUNDANT INPUT EVENTS

BACKGROUND OF THE INVENTION

1. Technical Field

The present invention relates to information retrieval methods and systems. In particular, the present invention relates to information retrieval methods and systems that can be utilized with remote networks. Still more particularly, the present invention relates to a method and system for decreasing performance degradation which occurs as a result of the triggering of multiple-user-input events by a remote network user.

2. Description of the Related Art

The development of computerized information resources, including remote networks, allows users of data-processing systems to link with other servers and networks, in order to retrieve vast amounts of electronic information heretofore unavailable in an electronic medium. The "Internet" is a system of geographically distributed remote networks interconnected by computers executing network protocols. Protocols allow users to interact and share information over the networks. A protocol is essentially a set of rules or standards designed to enable computers to connect with one another and to exchange information with as little error as possible. Due to this wide-spread information sharing, remote networks such as the "Internet" have generally evolved into an "open" system for which developers can design software for performing specialized operations or services, essentially without restriction.

The term "Internet" is an abbreviation for "Internetwork," and refers commonly to the collection of networks and gateways utilizing the TCP/IP suite of protocols, well-known in the art of computer networking. TCP/IP is an acronym for "Transport Control Protocol/Interface Program," a software protocol developed by the Department of Defense for communication between computers. A protocol is a set of rules governing the format and meaning of messages or "packets" exchanged over networks. Each of the services available over the Internet is generally defined by its own networking protocol.

Electronic information transferred between networks is usually presented in hypertext format, a metaphor for presenting information in a manner in which text, images, sounds, and actions become linked together in a complex non-sequential web of associations that permit the user to "browse" or "navigate" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyper-link information is contained within hypermedia and hypertext documents, which allow a user to go back to the "original" or referring site by the mere "click" (i.e., with a mouse or other pointing device) of the hyper-linked topic.

A typical networked system that utilizes hypertext and hypermedia conventions follows a client-server architecture. In a client-server architecture, a client is usually a computer that accesses shared network resources provided by another computer (i.e., a server). A request by a user for news can be sent by a client application program to the server, which can be a remote computer system accessible over a remote network. The server scans and searches for raw (e.g., unprocessed) information sources (e.g., newswire feeds or newsgroups). Based upon user requests, the server presents filtered electronic information as server responses to the client process.

Client and server communicate with one another utilizing the functionality provided by Hypertext Transfer Protocol (HTTP). The World Wide Web (WWW) or, simply, the "Web," includes all the servers adhering to this standard which are accessible to clients via a Universal Resource Locator (URL). Remote network services such as the World Wide Web are typically accessed by specifying a unique network address (i.e., Universal Resource Locator). Universal Resource Locators have two basic components: the protocol to be used and the object pathname. For example, the Universal Resource Locator address, "http://www.uspto.gov" (i.e., home page for the U.S. Patent and Trademark Office), specifies a hypertext transfer protocol ("HTTP") and a pathname of the server (e.g., "www.uspto.gov"). The server name is associated with a unique numeric value (i.e., TCP/IP address).

Client and server are typically coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to Web "pages" constructed from a Hypertext Markup Language (HTML), or other server-generated data. HTTP, in the context of the World Wide Web, is simply a protocol that provides file transfers for hypertext-based information among local and remote systems.

Client and server typically display browsers for utilization by a user via a graphical user interface, a type of display format that enables users to choose commands, start programs, and see lists of files and other options by pointing to pictorial representations (e.g., icons) and lists of menu items on the screen. Choices can generally be activated either with a keyboard or pointing device such as a mouse. A browser presents information to a user through a graphical user interface window by displaying images, graphics, or text within the window region. The user, in turn, communicates with the application by "pointing" at graphical objects in the window with a pointer controlled by a hand-operated pointing device, such as a mouse, or by pressing keys of a keyboard.

The "Web" imposes a technique for interacting with data that differs from current graphical user interface models. In most graphical user interfaces, a double mouse button "click" is required to open applications and view data. The Web, however, employs a different model. A single mouse button click on a hypertext link typically allows a user to move to a new page, open images, play audio files, launch applications, and so forth.

Unfortunately, old habits die hard, and users often double click hypertext links to navigate the Web in the same manner learned via traditional graphical user interfaces. Sometimes, a double or multiple click of a hypertext link may result in the launching of multiple instances of a single application, which can adversely degrade the performance of the computer or data-processing system utilized by the user to navigate through remote networks such as the Internet. Some applications launched from remote networks such as the Internet via hypertext links require a time span of five to ten seconds after a "click" of a particular hypertext link, prior to being displayed for the user. The mouse pointer itself may briefly change shape or form to indicate to the user a "busy" state (i.e., that the desired application is loading).

However, because the mouse pointer changes shape only momentarily while the application continues to load, the user may believe that nothing, in fact, has happened, and may try to "click" the same hypertext link again. In effect, the user accidentally may have launched the desired application three or four times before realizing what has happened. Multiple layers of the same application can thus run in different background windows while the user continues to work in the environment of an active window. The user may not realize that several copies of the same application are running. However, the user will experience a performance degradation on the data-processing system in which the browser is displayed.

From the foregoing, it can be seen that a need exists for a method and system that prevent accidental multiple launches of applications from a remote network. Such a solution would allow users to safely launch a single copy of a given application, preventing the user from overloading the data-processing system running the application to the point where the data-processing system becomes unstable.

SUMMARY OF THE INVENTION

It is therefore an object of the invention to provide for an improved information retrieval method and system.

It is another object of the invention to provide for an improved information retrieval method and system that can be utilized with a remote network.

It is still another object of the invention to provide an improved method and system for decreasing performance degradation due to the triggering of multiple user-input events by a remote network user.

The above and other objects are achieved as is now described. A method and system are disclosed in a network application for decreasing performance degradation by preventing inadvertent launching of multiple copies of identical network applications. Initially, a remote application is launched from a server to a client in response to a user input event. Next, it is determined if a remote application identical to the remote application has already been launched. If the remote application has already been launched, an elapsed time since the identical remote application was initially launched is determined. Thereafter, the launching of the network application is terminated if the elapsed time is less than a preset value. Alternatively, if the elapsed time is greater than the preset value, the network application is launched. Additionally, if the elapsed time is greater than the preset value, a weighted value of applications running with the client is determined. Thereafter, the network application is launched if the weighted value is small. Alternatively, if the weighted value is large, launching of the network application is terminated.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
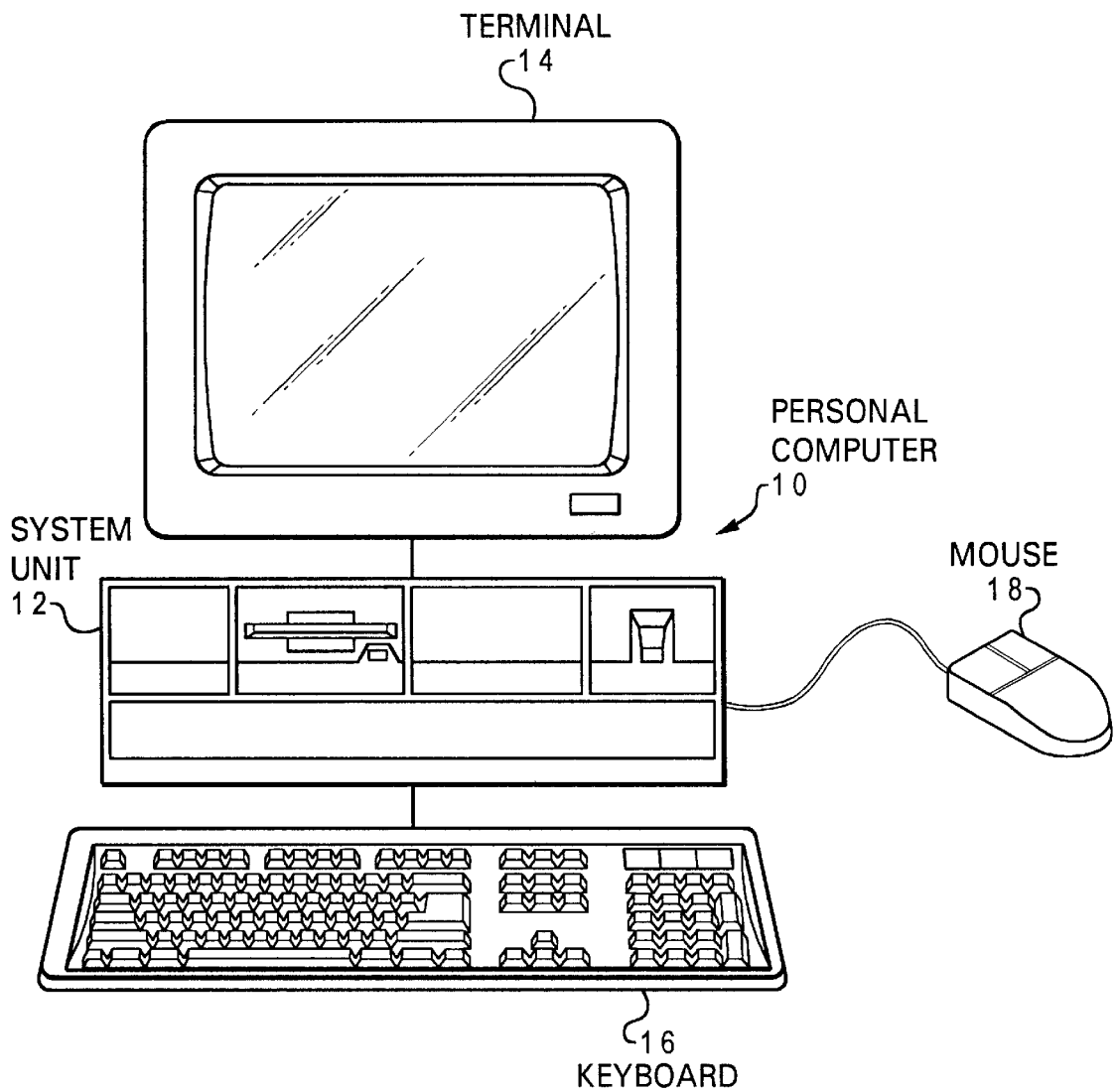
FIG. 1 is a pictorial representation of a data-processing system which can be implemented in accordance with the method and system of the present invention.

With reference now to the figures and in particular with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown) such as a trackball or stylus also can be included with personal computer 10. Computer 10 can be implemented utilizing any suitable computer such as an IBM Aptiva™ computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10. Computer 10 also can be implemented utilizing any suitable computer such as the IBM RISC/6000 computer, a product of International Business Machines Corporation. "RISC SYSTEM/6000" is a trademark of International Business Machines Corporation, and also can be referred to as the "RS/6000."

Figure 2:
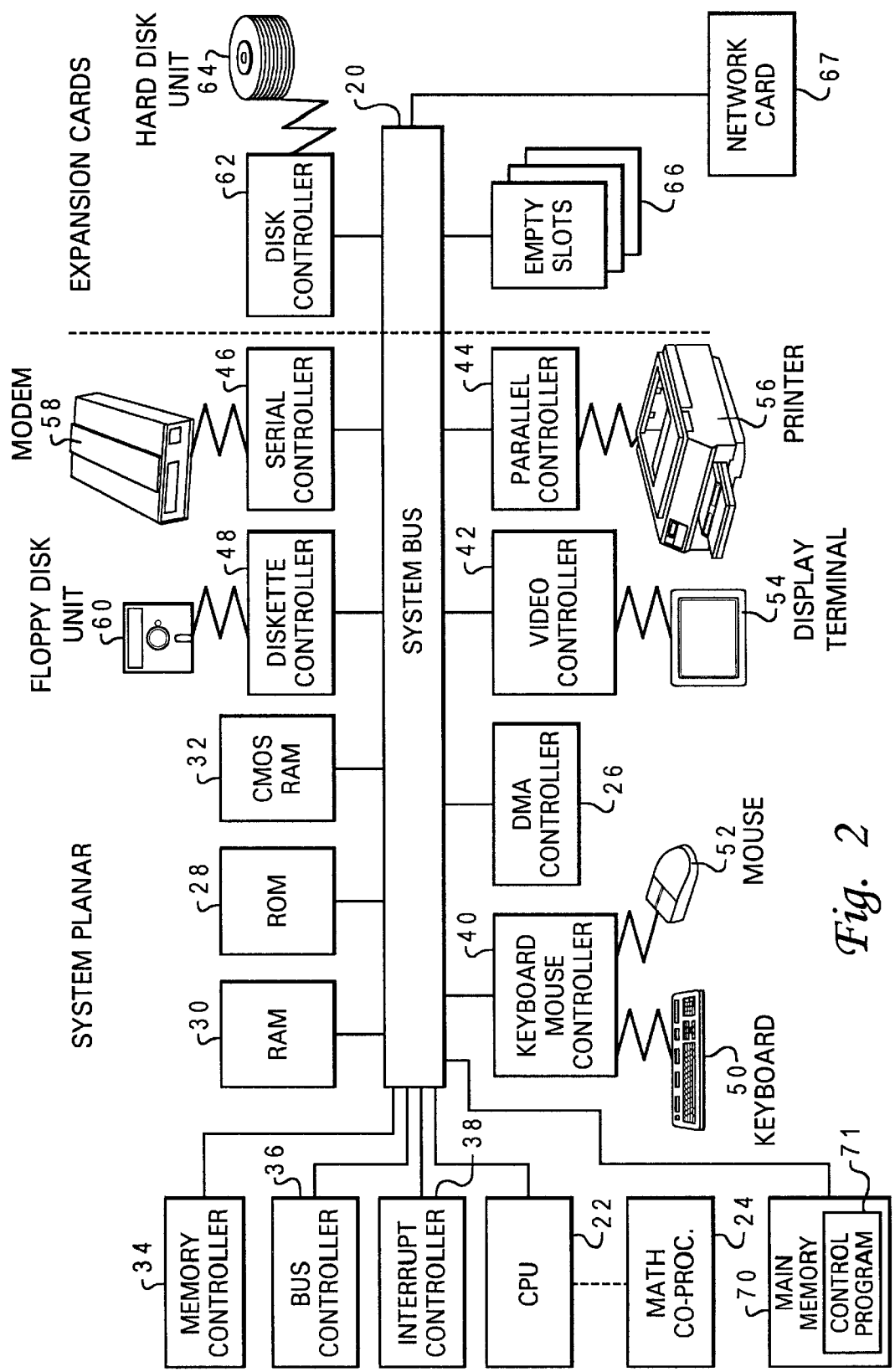
FIG. 2 depicts a block diagram illustrative of selected components in a personal computer system which can be utilized in accordance with the method and system of the present invention.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 is also connected to system bus 20 and allows various devices to appropriate cycles from CPU 22 during large input/output ("I/O") transfers.

Read-only memory ("ROM") 28 and random-access memory ("RAM") 30 also are connected to system bus 20. ROM 28 is mapped into the CPU 22 address space in the range from 640 K to 1 megabyte. CMOS RAM 32 is attached to system bus 20 and contains system configuration information. Any suitable machine-readable media may retain the graphical user interface of computer 10 of FIG. 1, such as RAM 30, ROM 28, a magnetic diskette, magnetic tape, or optical disk. Also connected to system bus 20 are memory controller 34, bus controller 36, and interrupt controller 38, which serve to aid in the control of data flow through system bus 20 between various peripherals, adapters, and devices.

System unit 12 of FIG. 1 also contains various I/O controllers such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices such as printer 56. Serial controller 46 provides a hardware interface for devices such as a modem 58. Diskette controller 48 provides a hardware interface for floppy-disk unit 60. Other technologies also can be utilized in conjunction with CPU 22, such as touch-screen technology or human voice control.

Main memory 70 is connected to system bus 20 and includes a control program 71. Control program 71 resides within main memory 70 and contains instructions that, when executed on CPU 22 carry out the operations depicted in the logic flowchart of FIG. 7 described herein. The computer program product also can be referred to as a program product. Control program 71 can support a number of remote network-access tools. An example of a remote network access tool is an HTTP-compliant "browser." Known browser software includes Netscape™, Netscape™ Navigator 2.0, Mosaic, and the like. Netscape™, in particular, provide the functionality specified under HTTP. "Netscape" is a trademark of Netscape, Inc. The Mosaic-brand browser is available from the National Center for Supercomputing Applications (NCSA) in Urbana-Champaign, Ill. The present invention is designed to operate with any of these known or developing Web browsers, in order to achieve a reduction in performance degradation associated with applications launched from a remote network.

Control program 71 also can support other remote network services, such as the file transfer protocol (FTP) service, which facilitates the transfer and sharing of files across a remote network such as the Internet. Control program 71 further can support remote network services such as remote terminal access (Telnet), which allows users to log onto computers coupled to network. In addition, control program 71 additionally can support services such as simple mail transfer protocol (SMTP) or E-mail, and network news transfer protocol (NNTP) or "Usenet," well-known in the art of computer networking.

It is important to note that, while the present invention has been (and will continue to be) described in the context of a fully functional computer system, those skilled in the art can appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives and CD ROMs, and transmission-type media such as digital and analog communication links.

Expansion cards also may be added to system bus 20, such as disk controller 62, which provides a hardware interface for hard-disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client-server architecture or to groups of computers and associated devices which are connected by communications facilities. Those skilled in the art will appreciate that the hardware depicted in FIG. 2 may vary for specific applications. For example, other peripheral devices such as: optical-disk media, audio adapters, or chip-programming devices such as a PAL or EPROM programming devices and the like also may be utilized in addition to or in place of the hardware already depicted. Note that any or all of the above components and associated hardware may be utilized in various embodiments. However, it can be appreciated that any configuration of the aforementioned system may be used for various purposes according to a particular implementation.

Figure 3:
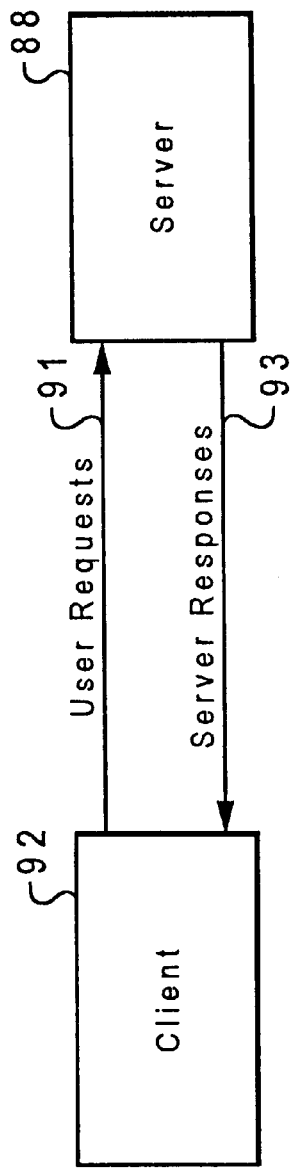
FIG. 3 illustrates a block diagram illustrative of a client-server architecture which can be utilized in accordance with the method and system of the present invention.
Figure 4:
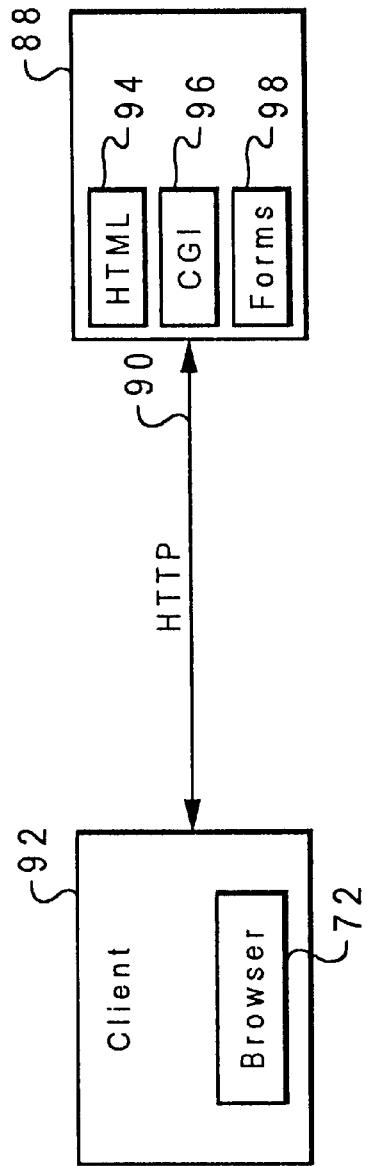
FIG. 4 depicts a detailed block diagram illustrative of a client-server architecture which can be utilized in accordance with the method and system of the present invention.
Figure 5:
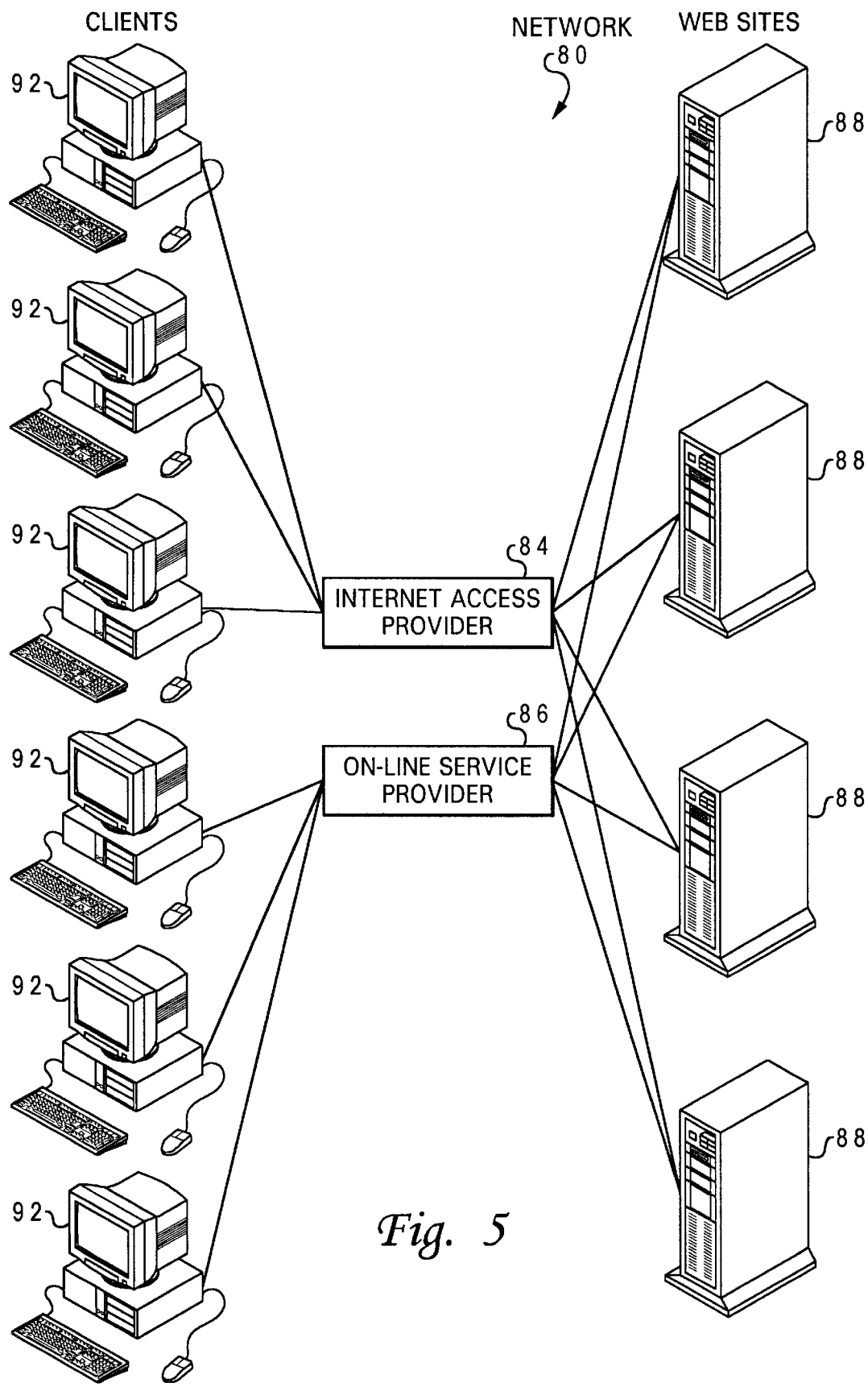
FIG. 5 is a diagram illustrative of a computer network which can be implemented in accordance with the method and system of the present invention.

In FIG. 3, FIG. 4, and FIG. 5, like parts are indicated by like numbers. FIG. 3 illustrates a block diagram illustrative of a client-server architecture which can be utilized in accordance with the method and system of the present invention. In FIG. 3, user requests 91 for news are sent by a client application program 92 to a server 88. Server 88 can be a remote computer system accessible over a remote network such as the Internet. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 4 illustrates a detailed block diagram of a client-server architecture which can be utilized in accordance with the method and system of the present invention. Although the client and server are processes that are operative within two computer systems, these processes being generated from a high-level programming language (e.g., PERL), which is interpreted and executed in a computer system at run-time (e.g., a workstation), it can be appreciated by one skilled in the art that they may be implemented in a variety of hardware devices, either programmed or dedicated.

Client 92 and server 88 communicate using the functionality provided by HTTP. Active within client 92 is a first process, browser 72, which establishes the connections with server 88, and presents information to the user. Such browsers are often referred to in the art of computer networking as "Web browsers" or simply "browsers." Any number of commercially or publicly available browsers may be utilized in accordance with a preferred embodiment of the present invention. For example, the Mosaic-brand browser available from the National Center for Supercomputing Applications (NCSA) in Urbana-Champaign, Ill., can be utilized with a preferred embodiment of the present invention. Other browsers, such as Netscape™, Netcruiser, or the Lynx-brand browsers or others which are available and provide the functionality specified under HTTP can be utilized with the present invention.

Server 88 executes the corresponding server software which presents information to the client in the form of HTTP responses 90. The HTTP responses 90 correspond with Web "pages," which can be represented by utilizing Hypertext Markup Language (HTML), or other data generated by server 88. For example, under the Mosaic-brand browser, in addition to HTML functionality 94 provided by server 88, a Common Gateway Interface (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion. Common Gateway Interface (CGI) 96 is one form of a "gateway," a device utilized to connect dissimilar networks (i.e., networks utilizing different communication protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic brand browser described herein. This functionality allows the user, via a client application program, to specify terms in which the server causes an application program to function (e.g., terms or keywords contained in the types of stories/articles which are of interest to the user). This functionality is an integral part of a search engine.

FIG. 5 is a diagram illustrative of a computer network 80 which can be implemented in accordance with the method and system of the present invention. Computer network 80 is representative of the Internet, a known remote network based on a client-server architecture. Conceptually, the Internet includes a large network of servers 88 which are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a "browser," which is a known software tool used to access servers 88 via the access providers. Each server 88 operates a so-called "Web site" which supports files in the form of documents and pages. A network path to servers 88 is identified by a Universal Resource Locator having a known syntax for defining a network collection.

Figure 6:
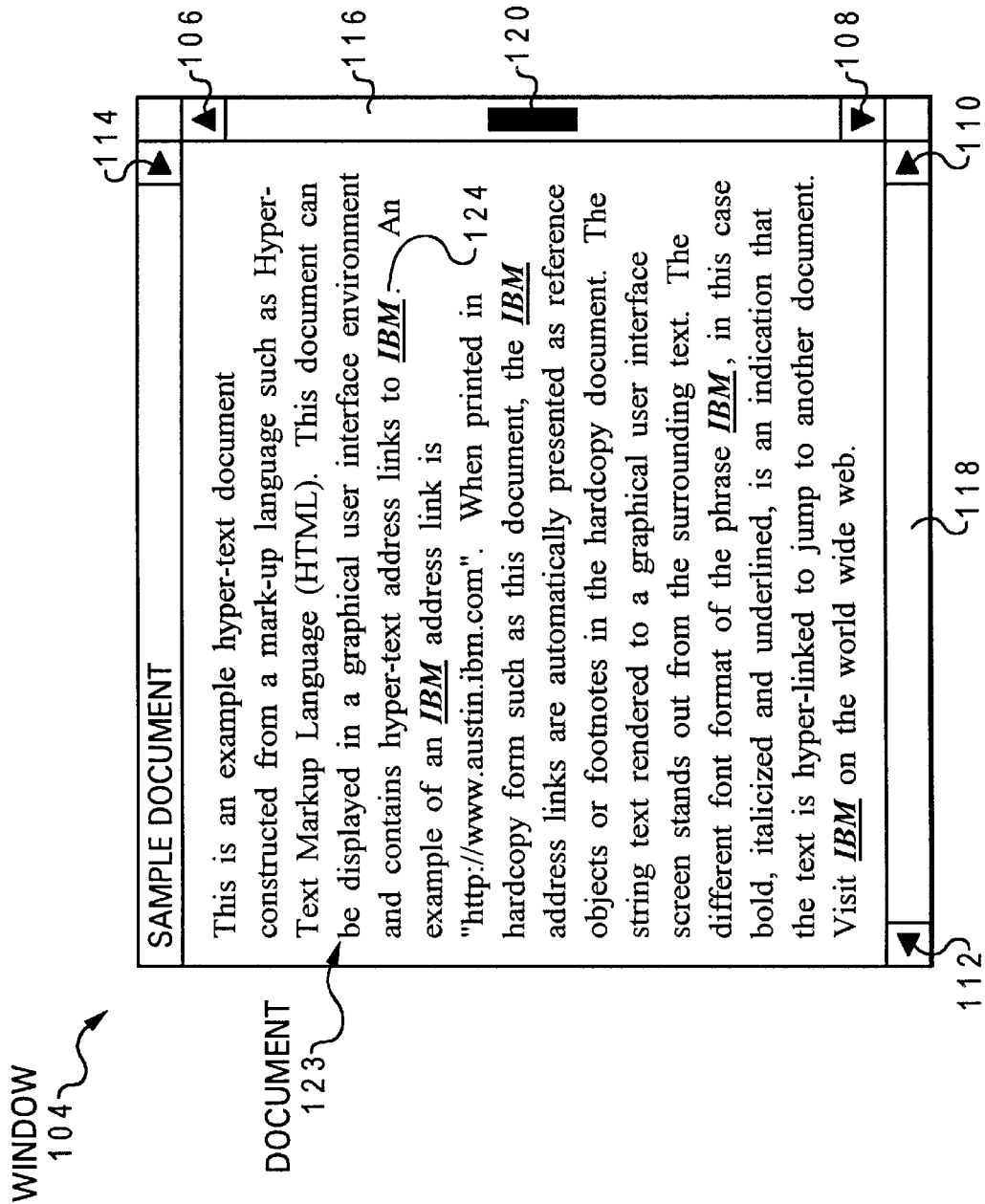
FIG. 6 illustrates an example hypertext document contained within a graphical user interface window and which can be utilized in accordance with the method and system of the present invention.

FIG. 6 illustrates an example hypertext document 123 contained within a graphical user interface window 104 which can be utilized in accordance with the method and system of the present invention. Window 104 displays a portion of a hypertext document 123 constructed from a mark-up language such as Hypertext Mark-up Language (HTML). The size and position of elevator 120 within scroll bar 116 corresponds to the size and position of the current viewable page in relation to hypertext document 123. Hypertext document 123 can be accessed from a data-processing system contained within a remote network such as the Internet.

In the example of FIG. 6, because hypertext document 123 includes too many pages to view simultaneously, the user can position a mouse cursor over up-arrow section 106 or arrow section 108 of scroll bar 116 and click a pointing device (e.g., a mouse) to scroll the hypertext document 123 upward or downward, as appropriate. A horizontal scroll bar 118 includes arrow sections 112 and arrow sections 110 for scrolling hypertext document 123 respectively left or right. Also, an optional arrow section 114 allows a user to scroll the document right. Thus, the graphical user interface that contains window 104 and hypertext document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Hypertext document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyperlinked to "jump" to another document. When a user clicks on string text 124 with a mouse or other pointing device, the graphical user interface shifts the presently viewed hypertext document 123 to another hyperlinked document.

Figure 7:
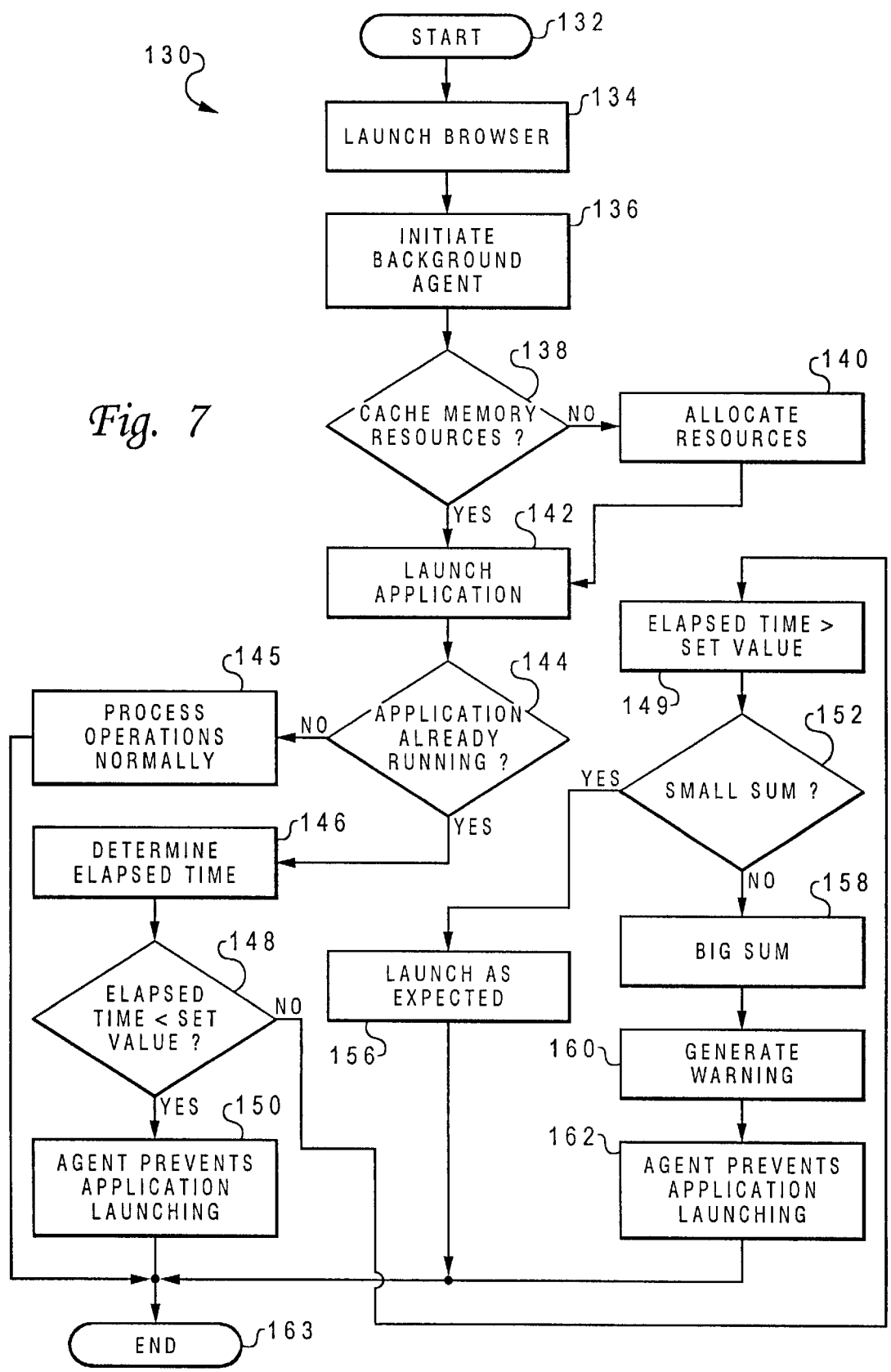
FIG. 7 illustrates a flowchart of operations illustrative of a method for limiting performance degradation due to multiple user-input events.

FIG. 7 illustrates a flowchart of operations 130 illustrative of a method for limiting performance degradation due to multiple user-input events. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient, at times, by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases, the distinction between the method operations in operating a computer and the method of computation itself should be borne in mind. The present invention relates to method steps for operating a computer, such as computer 10 of FIG. 1, in processing electrical or other (e.g. mechanical, chemical) physical signals to generate other desired physical signals.

Thus, as illustrated in FIG. 7 at block 132, the process steps are initiated. As described at bock 134, a network navigator or browser is launched. As depicted at block 136, a background agent is initiated to check for multiple user inputs such as double or triple mouse button presses. A designer of a Web page displayed within the browser assigns a weight to each application that can potentially be launched via a Web browser. This weight assignment is dependent upon memory resources, CPU consumption, paging space, or any other resource the designer deems necessary.

As described at block 138, a test is performed to determine whether enough of these resources exist to continue operation of the agent. If the test determines that enough resources do not exist, then, as illustrated at block 140, these resources are allocated to allow continued operation of the agent. As described at block 142, a desired application is launched from the Internet via a hypertext link such as the hypertext links depicted in FIG. 6. As illustrated at block 144, when the application is launched, a test is performed to determine whether or not this particular application is already running.

If it is determined that the application is not already running, the browser operations continue processing normally. That is, the application is launched in a normal manner and displayed as a Web page within the Web browser. If it is determined that the application is already running, then, as depicted at block 146, the agent determines how much time has elapsed since the application was launched. Next, as illustrated at block 148, if the elapsed time is less than a set value (e.g., 500 microseconds), the agent then, as depicted at block 150, prevents the application from being launched. The process then terminates, as described at block 163.

FIG. 7 describes logical operations in a computer network for decreasing performance degradation due to launching of multiple network applications. The computer network includes a client connected to one or more servers. The process described in FIG. 7 can be described generally as follows: a remote application is launched from a server in response to a user input event. The user input event can include activities such as "clicking" a pointing device such as a mouse. A remote application is launched from a server in response to the user input event.

It must then be determined if an identical remote application has already been launched. If an identical remote application has already been launched, an elapsed time since launching of the identical remote application is then determined. If the elapsed time is less than a preset value, the launching of the remote application is terminated. If the elapsed application is greater than the preset value, a weighted value of applications running within the client is then determined. If the weighted value is small, the remote application is launched. If the weighted value is large, the launching of the remote application is terminated.

The operations described in FIG. 7 can prevent those instances when a user, for example, intentionally or accidentally "double clicks" a pointing device such as a mouse at a hypertext link displayed within a graphical user interface. Such a double click can result in the launching of multiple instances of an identical application from the Internet. The application may take several seconds to load fully into the client workstation or computer following launching via the hypertext link. During this time interval, the user may erroneously believe that the application has not launched and may try to "click" the pointing device a second or third time.

In effect, in such a situation, the user will have launched the application several times before realizing what has actually occurred. In the meantime, prior to this realization, the additional copies of the same application may be running (i.e. depending on the particular browser implementation and graphical user interface utilized by the browser) within several different background windows. The additional running applications may result in increased performance degradation. Running several identical applications simultaneously leads to a decrease in memory and cache space, which, in turn, contributes to system performance degradation.

While the invention has been particularly shown as described with reference to a preferred embodiment, it will be understood by those skilled in the art that various changes in form and detail may be made therein without departing from the spirit and scope of the invention. For example, the present invention is applicable to many types of networks, including remote networks such as Internet, and so-called "intranets." Therefore, it is contemplated that such modifications can be made without departing from the spirit or scope of the present invention as defined in the appended claims.

What is claimed is:

1. A method in a computer network for decreasing performance degradation due to inadvertent launching of multiple network applications, said computer network including a client connectable to one or more servers, comprising the steps of:

launching a remote application from a server in response to a user input event;

determining if a remote application identical to said remote application has already been launched;

if said identical remote application has already been launched, determining an elapsed time since said identical remote application was initially launched; and terminating launching of said remote application if said elapsed time is less than a preset value.

2. The method of claim 1 further comprising the step of:

launching said remote application if said elapsed time is greater than said preset value.

3. The method of claim 1 further comprising the steps of:

if said elapsed time is greater than said preset value, determining a weighted value of applications running within said client and determining whether to launch said remote application utilizing said weighted value of applications.

4. A system in a computer network for decreasing performance degradation due to inadvertent launching of multiple network applications, said computer network including a client connectable to one or more servers, comprising:

launching means for launching a remote application from a server in response to a user input event;

means for determining if a remote application identical to said remote application has already been launched;

means for determining, if said identical remote application has already been launched, an elapsed time since said identical remote application was initially launched; and means for terminating launching of said remote application if said elapsed time is less than a preset value.

5. The system of claim 4 further comprising:

means for launching said remote application if said elapsed time is greater than said preset value.

6. The system of claim 4 further comprising:

means for determining, if said elapsed time is greater than said preset value, a weighted value of applications running within said client and for determining whether to launch said remote application utilizing said weighted value of applications.

7. A program product residing in computer memory in a computer network for decreasing performance degradation due to inadvertent launching of multiple network applications, said computer network including a client connectable to one or more servers, said program product comprising:

launching means for launching a remote application from a server in response to a user input event;

means for determining if a remote application identical to said remote application has already been launched;

means for determining, if said identical remote application has already been launched, an elapsed time since said identical remote application was initially launched;

means for terminating launching of said remote application if said elapsed time is less than a preset value; and signal-bearing media bearing:
said launching means;
said means for determining if a remote application identical to said remote application has already been launched;
said means for determining, if said identical remote application has already been launched, an elapsed time since said identical remote application was initially launched; and
means for terminating launching of said remote application if said elapsed time is less than a preset value.

8. The program product of claim 7 further comprising:

means for launching said remote application, if said elapsed time is greater than said preset value; and said signal-bearing media further comprising signal-bearing media bearing said means for launching said remote application if said elapsed time is greater than said preset value.

9. The program product of claim 7 further comprising:

means for determining, if said elapsed time is greater than said preset value, a weighted value of applications running within said client and for determining whether to launch said remote application utilizing said weighted value of applications; and said signal-bearing media further comprising signal-bearing media bearing:
said means for determining, if said elapsed time is greater than said preset value, a weighted value of applications running within said client;
said means for launching said remote application if said weighted value is small; and said means for terminating launching of said remote application if said weighted value is large.

10. The program product of claim 8 wherein:

said signal-bearing media further comprises recordable media.

11. The program product of claim 8 wherein:

said signal-bearing media further comprises transmission media.

12. The program product of claim 9 wherein:

said signal-bearing media further comprises recordable media.

13. The program product of claim 9 wherein:

said signal-bearing media further comprises transmission media.

14. A method in a computer network for decreasing performance degradation due to inadvertent launching of multiple network applications, said computer network including a client connectable to one or more servers, comprising the steps of:

launching a remote application from a server in response to a user input event;

determining if a remote application identical to said remote application has already been launched;

if said identical remote application has already been launched, determining an elapsed time since said identical remote application was initially launched;

terminating launching of said remote application if said elapsed time is less than a preset value; and if said elapsed time is greater than said preset value, determining a weighted value of applications running within said client and determining whether to launch said remote application utilizing said weighted value of applications.

15. The method of claim 14 further comprising the step of launching said remote application if said elapsed time is greater than said preset value.

16. A computer network for decreasing performance degradation due to inadvertent launching of multiple network applications, said computer network including a client connectable to one or more servers, comprising:

means for launching a remote application from a server in response to a user input event;

means for determining if a remote application identical to said remote application has already been launched;

means for determining an elapsed time since said identical remote application was initially launched if said identical remote application has already been launched;

means for terminating launching of said remote application if said elapsed time is less than a preset value; and means for determining a weighted value of applications running within said client and for determining whether to launch said remote application utilizing said weighted value of applications if said elapsed time is greater than said preset value.

17. The computer network of claim 16 further comprising means for launching said remote application if said elapsed time is greater than said preset value.

* * * * *